United States Patent [19]

Herold et al.

[11] Patent Number: 5,681,366
[45] Date of Patent: Oct. 28, 1997

[54] NEUTRAL METAL ALKANOATE MICRONUTRIENT SOLUTIONS AND METHOD OF MANUFACTURING SAME

[75] Inventors: Anthony E. Herold, Greeley, Colo.; James L. Hausmann, Carroll, Iowa

[73] Assignee: Platte Chemical Company, Greeley, Colo.

[21] Appl. No.: 689,555

[22] Filed: Aug. 9, 1996

Related U.S. Application Data

[63] Continuation-in-part of Ser. No. 679,930, Jul. 15, 1996.

[51] Int. Cl.$^6$ ................................................ C05G 3/00
[52] U.S. Cl. ........................... 71/27; 71/64.1; 71/DIG. 2; 504/118; 556/134
[58] Field of Search .................. 71/127, 54, 61, 71/64, DIG. 2; 556/134; 504/118

[56] References Cited

U.S. PATENT DOCUMENTS

| | | | |
|---|---|---|---|
| 3,854,923 | 12/1974 | Ott | 71/1 |
| 3,909,229 | 9/1975 | Ott | 71/64.1 |
| 3,997,319 | 12/1976 | Ott | 71/27 |
| 4,352,688 | 10/1982 | Ott | 71/11 |

FOREIGN PATENT DOCUMENTS 0856169  9/1981  U.S.S.R. .

OTHER PUBLICATIONS

Label, "ACA Concentrate® 15–0–0, No. 32184," publ. on or about 1992, Platte Chemical Co., Fremont, NE. no month.
Label, "ACA Concentrate® 15–0–0, No. 34217," publ. on or about 1992, Platte Chemical Co., Fremont, NE. no month.
"ACA® Concentrate +N–Serve* Anhydrous Program" brochure, publ. on or before Sep. 1992, Grower Service Group, Terre Haute, Indiana.
"ACA® Concentrate +N–Serve* Fall Anhydrous Program" brochure, publ. on or before Sep. 1992, Grower Service Group, Terre Haute, Indiana.
"ACA® Wheat Program" brochure, publ. on or before Sep. 1993, Grower Service Group, Terre Haute, Indiana.
"Renu Nitrogen–Zinc Plant Nutrient Solution" label, publ. on or before Jan. 1993, T-Tech Corp., Chester VA.
"Model 1005 Dispensing System" publ. on or before Jan. 1993, Economy Controls Corp., St. Louis, Mii.
"Help Your Crops Achieve Full Yield Potential—Ask For ACA Concentrate," brochure, publ. or or before Jan. 1993, United Agri Products, Inc., Greeley, Colorado.
"ACA Impregnation System" brochure, publ. Feb. 26, 1993, Grower Service Corp., Terre Haute, Indiana.
"Increase Corn Yields Over the Winter", publ. on or before Jan. 1993, Midwest Valley Che., Wall Lake, IIA.
"ACA Salesman Handbook", pp. 1–39, publ. on or before Nov. 1991, United Agri Products, Inc., Greeley, Colorado.
"Asset™ Plant Root Stimulator" label, publ. on or before Nov. 1992, Setre Chemical Co., Memphis, Tennessee.
"Asset™ Plant Root Stimulator" brochure, publ. on or before Nov. 1992, Setre Chemical Co., Memphis, Tennessee.
"Asset Results—1990," Helena Agri–Dealer, publ. on or before Jul. 1992, Helena Chemical Co., Memphis, TN.
"Root Stimulator Improves Standability Yield, Health of Soybean Crops in Midwest," Helena Agri–Dealer, publ. on or before Jul. 1992, Helena Chemical Company, Memphis, Tennessee.
"Difference In Roots Stems From Asset," Helena Agri–Dealer, publ. on or before Jul. 1992, Helena Chemical Company, Memphis, Tennessee.
"Asset" promotional video, ©on or before 1993, Helena Chemical Company, Memphis, Tennessee no month.

*Primary Examiner*—Ferris Lander
*Attorney, Agent, or Firm*—Carol W. Burton, Esq.; Holland & Hart LLP

[57] ABSTRACT

A substantially neutral metal alkanoate solution suitable for application of the constituent micronutrient metal to agricultural crops or acreage where such crops are to be grown, is disclosed. Alkanoates having from 2 to 6 carbon atoms are preferred, with acetates most preferred. Metals selected from the group consisting of boron, calcium, copper, iron, magnesium, manganese, molybdenum, potassium, sodium and zinc are preferred, with zinc particularly preferred. The compositions of the present invention remain soluble at and below freezing temperatures for extending periods, and exhibits a high degree of miscibility in fertilizers. A method of manufacturing the compositions of the present invention is disclosed, in which a metal oxide is dispersed in water, ammonia is added to the dispersion, and acid is added to the basic dispersion to solubilize and substantially neutralize the dispersion and create an aqueous micronutrient solution.

20 Claims, No Drawings

NEUTRAL METAL ALKANOATE MICRONUTRIENT SOLUTIONS AND METHOD OF MANUFACTURING SAME

RELATED APPLICATION

The present application is a continuation-in-part application of copending U.S. patent application Ser. No. 08/679,930 for NEUTRAL METAL ALKANOATE MICRONUTRIENT SOLUTIONS AND METHOD OF MANUFACTURING SAME, filed Jul. 15, 1996.

FIELD OF THE INVENTION

This invention relates to micronutrient compositions suitable for application to crops and having increased aqueous solubility alone and in combination with fertilizers. More particularly, this invention relates to aqueous ammoniacal ionic solutions of metal alkanoates and to methods of manufacturing same.

BACKGROUND OF THE INVENTION

Fertilizers and plant additives are commonly applied to the soil in which crops are to be grown and may also be broadcast after plants have emerged from the soil. For example, aqueous ammoniacal ionic solutions of alkanoates having two to six carbon atoms have proven effective in stimulating plant growth in corn, soy beans, wheat and other crops. Metal ammonium alkanoates have proven especially effective with agriculturally acceptable metals selected from the group consisting of boron, calcium, copper, iron, magnesium, manganese, molybdenum, potassium, and zinc.

More particularly, U.S. Pat. No. 4,352,688 for "Nitrogen Fertilizers" to Ott, incorporated herein by reference, teaches that low molecular weight alkanoic acids and alkanoate anions thereof, particularly acetic acid and acetate ions, effectively promote plant growth and yield by enhancing the ability of nitrogen fertilizers. U.S. Pat. No. 3,909,229 for "Plant Nutrients" to Ott, also incorporated herein by reference, teaches aqueous ammoniacal ionic solutions of zinc carboxylates, for example zinc acetate in combination with ammonia, as effective fertilizers. U.S. Pat. No. 3,997,319 for "Fertilizing Method" to Ott, incorporated herein by reference, teaches the application of substantially anhydrous liquid ammonia containing an ionic solution of a zinc carboxylate to soil below the surface of the soil, in order to supply zinc and nitrogen to plants growing in the soil.

One agricultural crop additive of the class of basic ammoniacal ionic solutions of zinc carboxylates described above is commercially available under the ACA® Concentrate 15-0-0 trade mark from Platte Chemical Company of Greeley, Colo. ACA® Concentrate 15-0-0 is currently available as a liquid containing 15% by weight ammoniacal nitrogen and 17% by weight zinc. ACA® Concentrate has a pH of approximately 11 and a strong ammonia smell. It is typically applied at a rate of a pint to ⅛ pint per acre. Because application of the solution is at relatively low rates per acre, application techniques are generally understood to require application in conjunction with an anhydrous ammonia, solid nitrogen fertilizer carrier, or fertilizer solution containing substantial amounts of phosphates.

Dilution of ACA® Concentrate in water at ratios of greater than 1:8 ACA® Concentrate:water is generally prohibited because undesired precipitation occurs. It is generally believed that the zinc tetramine acetate in the ACA® Concentrate remains in solution at pH 11, but excess dilution with water causes the pH to drop and a zinc ammonium complex to precipitate out. Thus, while in many circumstances it would be preferable to apply ammoniacal ionic solutions of metal alkanoates with water by overhead sprinkler systems, in-furrow, broadcast on the ground or in the air, using side dress techniques or with drip irrigation techniques, use of such application techniques has not been entirely successful.

Application of ammoniacal ionic solutions of metal alkanoates with a wide variety of liquid fertilizers, herbicides and pesticides would also be preferred, but solubility problems of such metal alkanoate solutions limit use of such techniques. These solubility problems partly relate to the water dilution problems previously mentioned. Other solubility problems are also present. For example, ACA® Concentrate is not readily soluble in all solutions.

While the solubility problems outlined above may be partially solved by application of the ammoniacal ionic metal alkanoate solutions with anhydrous ammonia, application of anhydrous ammonia has other associated problems. Anhydrous liquid ammonia is typically injected below the soil surface, under pressure, in the fall-after the end of the growing season, in early spring—prior to planting, or in late spring-post-emergence, i.e. after a crop has germinated and leafed out. While anhydrous liquid ammonia is readily assimilated by plants and thus is a preferred fertilizer, the pressurized injection methods conventionally used are not suitable for use under wet or stormy conditions. When weather conditions are unsuitable, growers may skip scheduled early spring, late spring or fall applications of anhydrous liquid ammonia. When this occurs, crop yields are likely to be reduced. Moreover, for any aqueous ammoniacal ionic solutions of metal alkanoates or other crop additives which were to be applied with anhydrous ammonia, a missed application of anhydrous ammonia also results in a missed application of the crop additive.

It is against this background that the significant improvements and advancements of the present invention have taken place.

OBJECTS OF THE INVENTION

It is the principal object of the present invention to develop micronutrient solution that can be diluted with water without undesired precipitation and without an ammoniacal smell or other unpleasant odor.

It is a further object of the present invention to achieve the root stimulation effects of aqueous ammoniacal ionic solution of metal alkanoates in crops using a micronutrient solution which can be readily diluted with water.

It is a yet further object of the present invention to apply a micronutrient solution have the aforementioned qualities, to plants in combination with a wide variety of fertilizer solutions.

SUMMARY OF THE INVENTION

In accordance with the major aspects of the present invention, a micronutrient composition containing a substantially neutral solution of metal alkanoates is disclosed. The preferred embodiments of the micronutrient composition of the present invention are readily diluted with water, and do not exhibit undesired precipitation. The micronutrient compositions of the present invention maintain solubility at lowered temperatures and in a wide variety of liquid fertilizers.

The preferred method of manufacturing the micronutrient compositions of the present invention involve the dispersion of a metal salt, most preferably zinc oxide, in water. Although zinc oxide is the most preferred metal oxides from which the compositions of the present invention may be manufactured, other metal salts may be used as a source of agriculturally acceptable metals selected from the group consisting of boron, calcium, copper, iron, magnesium, manganese, molybdenum, potassium, sodium and zinc. Anhydrous ammonia is then slowly added to the metal salt dispersion. Thereafter, a carboxylic acid, preferably one with two to six carbon atoms such as acetic and propionic acid, most preferably acetic acid, is added slowly, with cooling, until the components are dissolved. The resulting micronutrient solution is then cooled. The micronutrient solution of the present invention has a pH of from 4 to 9, preferably from 6 to 7 and most preferably from 6.5 to 7.0.

When utilizing the aforementioned method to manufacture the most preferred micronutrient composition of the present invention with zinc oxide and acetic acid, the resulting product has a slightly sweet odor, and preferably has pH of approximately 6.5 to 7.0. When applied to corn, this micronutrient solution it has been found to effectively promote root growth.

A more complete appreciation of the present invention and its scope can be obtained from understanding the following detailed description of presently preferred embodiments of the invention, and the appended claims.

DETAILED DESCRIPTION OF THE INVENTION

In accordance with the present application, it has been discovered that an improved composition for application to crops is obtained by dispersing a metal salt, most preferably zinc oxide, in water, and then adding ammonia, most preferably anhydrous ammonia, to the dispersion. A carboxylic acid, for example acetic acid, as added to the basic dispersion, until the contents of the dispersion are solubilized and the solution is substantially neutralized. The resulting micronutrient solutions have a slightly sweet smell, and may be readily diluted in water and in a wide variety of fertilizer solutions. Because of the serious water dilution problems experienced with ammoniacal ionic solutions of zinc acetate, the stability and solubility of the micronutrient solutions of the present invention were unexpected. Indeed, it was expected that when the most preferred composition of the present invention was neutralized with acetic acid, the solution would become so saturated with ammonium acetate that crystallization would occur, especially at lower temperatures. However, even after discovering such was not the case, the ability of such compositions to stimulate root growth remained unknown. As is discussed in further detail below, it has been determined that micronutrient compositions of the present invention manufactured from water, zinc oxide, anhydrous ammonia and acetic acid, do exhibit root stimulation capability when applied to corn.

While metal oxides are a preferable constituent of the micronutrient compositions and methods of the present invention, other metal salts may be used, among which are zinc oxide, zinc hydroxide, zinc sulfate, zinc acetate, zinc chloride, zinc nitrate, zinc citrate, zinc lactate, zinc phosphate, zinc propionate, magnesium acetate, magnesium oxide, magnesium hydroxide, magnesium chloride, magnesium glucoheptonate, magnesium propionate, magnesium sulfate, magnesium lactate, manganese acetate, manganese carbonate, manganese oxide, manganese sulfate, manganese borate, manganese iodide, manganese oleate, manganese sulfide, manganese silicate, manganese dibasic phosphate, calcium oxide, calcium hydroxide, calcium chloride, calcium acetate, calcium propionate, calcium benzoate, calcium gluconate, calcium hypochlorite, calcium molybdate, calcium nitrate, calcium nitrite, calcium phosphate, calcium succinate, calcium tetraborate, calcium thiosulfate, cupric hydroxide, copper acetate, copper sulfate, cupric acetate, cupric benzoate, cupric chlorite, cupric chlorate, cupric formate, cupric sulfate, cuprous acetate, cuprous chloride, cuprous oxide, cuprous sulfite, cuprous iodide, ferric ammonium citrate, ferric ammonium sulfate, ferric formate, ferric chloride, ferric hydroxide, ferric oxide, ferric phosphate, ferrous chloride, ferrous citrate, ferrous phosphate, ferrous lactate, ferrous oxide, ferrous succinate, ferrous iodide, ferrous sulfate, ferrous thiocynate, cobaltic acetate, cobaltic fluoride, cobaltic oxide monohydrate, cobaltic potassium nitrite, sodium tetraborate, sodium molybdate, ammonium molybdate, molybdenum trioxide and molydenum disulfide. The compositions and methods of the present invention are preferably neutralized with carboxylic acid having the formula RCOOH. Exemplary acids include formic, isovaleric, acetic, pivalic, propionic, butanoic, hexanoic, caproic, acrylic, caprylic, butyric capric, isobutyric, lauric, crotonic, mysristic, valeric, palmitic, isovaleric, oleic, pivalic, linoleic, stearic, benzoic, cyclopentanecarboxylic, citric and mixtures thereof. The micronutrient solution of the present invention has a pH of from 4 to 9, preferably from 6 to 7 and most preferably from 6.5 to 7.0. Examples I–XV below describe the manufacture of preferred micronutrient solutions of the present invention.

EXAMPLE I

Water (29.1 grams) was added to a mixing vessel placed in an ice water bath. Powdered zinc oxide (10.8 grams, high purity, French process) was added to the water in the mixing vessel and mixed with cooling until the zinc oxide was evenly dispersed. Anhydrous ammonia (9.6 grams) was metered into the zinc oxide dispersion slowly to produce a basic ammoniacal mixture of zinc oxide. Thereafter, 50.5 grams of 99.9% acetic acid was slowly added with mixing, with the mixture cooled so as to maintain a temperature below 120° F. throughout mixing. After mixing was complete, the resulting solution was cooled to below 100° F. The final micronutrient solution had a pH of approximately 6.8, a specific gravity of 1.237 gm/ml at 25° C., a viscosity of less than 50 centipoise at 70° F., was clear and colorless at 70° F. and pale yellow-green at 0° F., and had a slightly sweet smell. The solution remained liquid after storage at 32° F. for 48 hours and after storage at 0° F. for 48 hours. One gram of the solution was miscible in 99 grams of 10-34-0 fertilizer solution, in 99 grams of a 9-18-9 solution and in 99 grams of a 28-0-0 solution.

EXAMPLE II

Water (29.1 grams) was placed in vessel sitting in an ice water bath. Powdered zinc oxide (10.8 grams) was added to the water in the mixing vessel and mixed, with cooling, until the zinc oxide was evenly dispersed. Anhydrous ammonia (9.6 grams) was metered into the zinc oxide solution slowly to produce a basic, ammoniacal ionic dispersion of zinc oxide, with cooling. Thereafter, 50.5 grams of 99.9% propionic acid was slowly added with mixing, with the mixture cooled so as to maintain a temperature below 120° F. throughout mixing. After mixing was complete, the resulting solution was cooled to below 100° F. The final product had a pH of approximately 6.7, a specific gravity of 1.18 gm/ml at 25° C. and a viscosity of less than 50 centipoise at 70° F.

The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE III

Water (29.1 grams) was placed in a mixing vessel sitting in an ice water bath. Powdered zinc oxide (10.8 grams) was added to the water in the mixing vessel and mixed, with cooling, until dispersed. Anhydrous ammonia (9.6 grams) was metered into the zinc oxide solution slowly to produce a basic, ammoniacal ionic dispersion of zinc oxide, with cooling. Thereafter, 25.25 grams of 99% acetic acid and 25.15 grams of 99.9% propionic acid was slowly added with mixing, with the mixture cooled so as to maintain a temperature below 120° F. throughout mixing. After mixing was complete, the resulting solution was cooled to below 100° F. The final product had a pH of approximately 7, a specific gravity of 1.20 gm/ml at 25° C. and a viscosity of less than 50 centipoise at 70° F. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE IV

In order to test the solubility of the composition of the present invention after addition of an excess amount of acid, water (23.1 grams) was placed in a vessel sitting in an ice water bath. Powdered zinc oxide (10.8 grams) was added to the water in the mixing vessel and mixed, with cooling, until dispersion. Anhydrous ammonia (9.6 grams) was metered into the zinc oxide solution slowly, with cooling, to produce a basic, ammoniacal ionic solution of zinc oxide. Thereafter, 56.5 grams of 99.9% acetic acid was slowly added with mixing, with the mixture cooled so as to maintain a temperature below 120° F. throughout mixing. After mixing was complete, the resulting solution was cooled to below 100° F. The final product had a pH of approximately 6.7, a specific gravity of 1.18 gm/ml at 25° C. and a viscosity of less than 50 centipoise at 70° F. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE V

In order to test the solubility of the composition of the present invention after addition of a lesser amount of acid in a more dilute micronutrient solution sitting in an ice water bath, water (38.1 grams) was placed in a mixing vessel. Powdered zinc oxide (10.8 grams) was added to the water in the mixing vessel and mixed, with cooling, until an even dispersion was obtained. Anhydrous ammonia (9.6 grams) was metered into the zinc oxide dispersion slowly to produce a basic, ammoniacal ionic dispersion of zinc. Thereafter, 41.5 grams of 99.9% acetic acid was slowly added with mixing, with the mixture cooled so as to maintain a temperature below 120° F. throughout mixing. After mixing was complete, the resulting solution was cooled to below 100° F. The final product had a pH of approximately 7.6, a specific gravity of 1.18 gm/ml at 25° C. and a viscosity of less than 50 centipoise at 70° F. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE VI

In order to test the solubility of the composition of the present invention after addition of a even lesser amount of acid in a more dilute micronutrient solution, water (47.1 grams) was placed in a container in an ice water bath. Powdered zinc oxide (10.8 grams) was added to the water in the mixing vessel and mixed, with cooling, until the zinc oxide was dispersed. Anhydrous ammonia (9.6 grams) was metered into the zinc oxide solution slowly to produce a basic, ammoniacal ionic dispersion of zinc oxide, as the jacket of the vessel was simultaneous cooled. Thereafter, 32.5 grams of 99.9% acetic acid was slowly added with mixing, with the mixture cooled so as to maintain a temperature below 120° F. throughout mixing. After mixing was complete, the resulting solution was cooled to below 100° F. The final product had a pH of approximately 8.6, a specific gravity of 1.164 gm/ml at 25° C. and a viscosity of less than 50 centipoise at 70° F. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE VII

Water (47.6 grams) was placed in a mixing vessel in an ice water bath. Powdered zinc oxide (10.8 grams) was added to the water in the mixing vessel and mixed, with cooling, until a dispersion was obtained. Anhydrous ammonia (9.6 grams) was metered into the zinc oxide solution slowly to produce a basic, ammoniacal ionic dispersion of zinc oxide. Thereafter, 32.5 grams of 99.9% lactic acid was slowly added with mixing, with the mixture cooled so as to maintain a temperature below 120° F. throughout mixing. After mixing was complete, the resulting solution was cooled to below 100° F. The final product had a pH of approximately 8.6, a specific gravity of 1.164 gm/ml at 25° C. and a viscosity of less than 50 centipoise at 70° F. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE VIII

Water (39.6 grams) was placed in a mixing vessel in an ice water bath. Powdered zinc oxide (10.8 grams) was added to the water in the mixing vessel and mixed, with cooling, until dispersion. Anhydrous ammonia (9.6 grams) was metered into the zinc oxide dispersion slowly to produce a basic, ammoniacal ionic solution of zinc oxide. Thereafter, 40 grams of 99.9% formic acid was slowly added with mixing, with the mixture cooled so as to maintain a temperature below 120° F. throughout mixing. After mixing was complete, the resulting solution was cooled to below 100° F. The final product had a pH of approximately 4.8, a specific gravity of 1.269 gm/ml at 25° C. and a viscosity of less than 50 centipoise at 70° F. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE IX

Water (39.9 grams) was placed in a vessel in an ice water bath. Powdered manganese oxide (10 grams) was added to the water in the mixing vessel and mixed, with cooling, until dispersion of the manganese oxide was complete. Ammonium hydroxide (22 grams of 28%) was added to the manganese oxide dispersion slowly with cooling to produce a basic, ammoniacal ionic solution of manganese oxide. Thereafter, 28 grams of 99% acetic acid was slowly added with mixing, with the mixture cooled so as to maintain a temperature below 120° F. throughout mixing. After mixing was complete, the resulting solution was cooled to below 100° F. The final product had a pH of approximately 8.3, a specific gravity of 1.187 gm/ml at 25° C., a viscosity of less than 50 centipoise at 70° F., and was a rust colored opaque liquid at room temperature. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE X

Water (4.8 grams) was placed in a mixing vessel together with 10 grams of 28% ammonium hydroxide. Powdered zinc oxide (10.8 grams) was added to the water in the mixing vessel and mixed, with cooling, until a complete dispersion was achieved. Additional ammonium hydroxide (23.9 grams of 28%) was added to the zinc oxide dispersion slowly to produce a basic, ammoniacal ionic dispersion of zinc oxide. Thereafter, 50.5 grams of 99% acetic acid was slowly added with mixing, with the mixture cooled so as to maintain a temperature below 120° F. throughout mixing. After mixing was complete, the resulting solution was cooled to below 100° F. The final product had a pH of approximately 5.8, a specific gravity of 1.209 gm/ml at 25° C., a viscosity of less than 50 centipoise at 70° F., and was a rust colored opaque liquid at room temperature. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE XI

Water (63.1 grams) was placed in a mixing vessel sitting in an ice water bath. Powdered calcium oxide (7.4 grams) was added to the water in the mixing vessel and mixed, with cooling, until a dispersion was formed. Additional ammonium hydroxide (23.9 grams of 28%) was added to the calcium oxide dispersion slowly to produce a basic, ammoniacal ionic dispersion of calcium oxide, with cooling Thereafter, 50.5 grams of 99% acetic acid was slowly added with mixing, with the mixture cooled so as to maintain a temperature below 120° F. throughout mixing. After mixing was complete, the resulting solution was cooled to below 100° F. The final product had a pH of approximately 10.2, a specific gravity of 1.121 gm/ml at 25° C., a viscosity of less than 50 centipoise at 70° F., and was a rust colored opaque liquid at room temperature. The solution remained liquid after storage at 32° F. for 48 hours and after storage at 0° F. for 48 hours. One gram of the solution was miscible in 99 gm of a 10-34-0 solution, in 99 gm of a 9-18-9 solution and in 99 gm of a 28-0-0 solution.

EXAMPLE XII

One pint of ACA® Concentrate 15-0-0 from Platte Chemical Company of Greeley, Colo. was mixed with 1.25 pint of an aqueous solution of 50% by weight citric acid and the mixture diluted with water to 20 gallons. The resulting solution had a pH of 7.47, was initially clear after mixing and remained clear at 1 hour after mixing, two hours after mixing and 24 hours after mixing. A control test was conducted in which one pint of ACA® Concentrate 15-0-0 was diluted with water to 20 gallons. The control had a pH of 8.83 and was initially cloudy after mixing. A precipitate had formed by one hour after mixing, and the precipitate remained present at two and 24 hours after mixing.

EXAMPLE XIII

One pint of ACA 15-0-0 Concentrate was mixed with 1 pint of 100% propionic acid. The resulting micronutrient solution was clear and remained clear when diluted with water to produce a 10% solution, a 5% solution and a 1% solution. The solution remained clear when diluted 1:320 in water.

EXAMPLE XIV

Two hundred grams of ACA 15-0-0 Concentrate was mixed with 120 grams of glacial acetic acid, and eighty grams of water then added thereto. The resulting micronutrient solution was clear and remained clear when diluted with water to produce a 10% solution, a 5% solution and a 1% solution. The solution remained clear when diluted 1:320 in water.

EXAMPLE XV

Four hundred fifty one grams of water was mixed with 88 grams potassium nitrate until dissolved. One hundred sixty two grams acetic acid was added slowly to the potassium nitrate solution. Three hundred grams of ACA 15-0-0 Concentrate was added to the acidified solution to form a substantially neutral solution. Nine hundred forty grams of a 28% nitrogen solution was added to the substantially neutral solution. Thereafter 1.95 grams of sodium borate (20.5% by weight boron) available from U.S. Borax Company under its Solubor tradename, 0.03 grams of sodium molybdate (39% molybdenum) available from Cyprus-Amax Company, 15 grams of a granular citric acid copper chelate (20% copper) available from Platte Chemical Company under its Citriplex tradename, 15 grams of a granular citric acid iron chelate (20% iron) available from Platte Chemical Company under its Citriplex tradename, 15 grams of a granular citric acid manganese chelate (20% manganese) available from Platte Chemical Company under its Citriplex tradename, and 12 grams of a granular citric acid zinc chelate (25% zinc) available from Platte Chemical Company under its Citriplex tradename, were dissolved in the nitrogen solution, and filtered through a sock filter to form an enhanced micronutrient solution. This solution had a pH of 6.44, a specific gravity of 1.25 and was clear and remained clear after storage at 32° through 96 hours after mixing. The solution was also clear when diluted with water to produce a 1% solution.

To determine whether a composition of the present invention was effective in stimulating root growth in plants, five studies were conducted in which various vegetative parameters were measured after treatment of separate sets of field corn with (1) ⅔ pint per acre of a zinc ammoniacal ionic acetate solution of pH of approximately 11 having a concentration of 15% by weight ammoniacal nitrogen and 17% by weight zinc ("ACA treatment"); (2) 1⅓ pint per acre of the neutralized zinc ammoniacal ionic acetate solution of Example I above (referred to herein as the ACA Neutral treatment); (3) 2 quarts per acre of the Example XV solution (referred to herein as the ACA Neutral with Chelated Metals treatment; and (4) no additional treatment (referred to in Table I as the Control). In one study, the solutions were applied as a side dressing in sandy loam, having a low overall moisture content, two inches to the side of furrow in which the corn seeds were planted. In two of the studies the solutions were applied in furrow in sandy loam having a low overall moisture content. In a fourth study the solutions were applied in-furrow to loam having a high overall moisture content, and in a fifth study, the solutions were applied in-furrow to loam having a medium overall moisture content. The results of the five studies are summarized in Table I (all lengths are in millimeters, all weights in grams).

TABLE 1

| VEGETATIVE PARAMETER | ACA TREATMENT | ACA NEUTRAL TREATMENT | ACA NEUTRAL WITH CHELATED METALS TREATMENT | CONTROL |
| --- | --- | --- | --- | --- |
| Stem diameter | 4.01 | 4.06 | 3.94 | 3.87 |
| Shoot length | 300.01 | 296.44 | 297.59 | 281.82 |
| Shoot wet weight | 1.92 | 1.92 | 1.91 | 1.77 |
| Shoot dry weight | 0.22 | 0.23 | 0.23 | 0.21 |
| Radical root length | 190.06 | 180.87 | 160.30 | 163.75 |
| Radical root wet weight | 0.61 | 0.61 | 0.47 | 0.58 |
| Total root dry weight | 0.0667 | 0.0733 | 0.0667 | 0.0600 |
| Number of seminal roots | 2.92 | 3.08 | 3.01 | 3.00 |
| Total length of seminal roots | 486.08 | 499.63 | 476.23 | 481.5 |
| Total weight of seminal roots | 0.40 | 0.43 | 0.42 | 0.42 |
| Number of first nodal roots | 3.24 | 3.26 | 3.25 | 3.12 |
| Total length first nodal roots | 425.54 | 412.83 | 425.69 | 383.94 |
| Wet weight of first nodal roots | 0.29 | 0.29 | 0.29 | 0.26 |

It is clear that the micronutrient composition of the present invention, as tested above, is effective in stimulating root growth in corn. This composition appears to be especially effective in promoting development of seminal roots in corn, development of which is believed important to improved corn yield.

To determine whether a composition of the present invention was effective in increasing crop yield when applied with a herbicide, four studies were conducted in soybean yield was measured after postemergent treatment of soybean plants. The four treatments comprised (1) broadcast application of 3 quarts per acre of LASSO® E.C., available through Monsanto Company of St. Louis, Miss., followed by broadcast application of 100 pounds per acre of 18-46-0 granular fertilizer; (2) broadcast application of a tank mixed solution comprising by the zinc ammoniacal ionic solution described above as ACA Concentrate 15-0-0 and LASSO® E.C. in a ratio, by volume, of 1:9, applied at a rate of 3 quarts per acre of LASSO® E.C. and ⅔ pint per acre of ACA Concentrate 15-0-0; (3) broadcast application of a tank mixed solution comprising by the micronutrient solution of Example XIII and LASSO® E.C. in a ratio, by volume, of 1:9, applied at a rate of 3 quarts per acre of LASSO® E.C. and ⅔ pint per acre of the Example XIV solution; and (4) broadcast application of 3 quarts per acre of LASSO® E.C., followed by broadcast application of 100 pounds per acre of 18-46-0 granular fertilizer to which ⅔ pint of ACA Concentrate 15-0-0 had been impregnated. The results of the studies are summarized in Table II

TABLE II

| TREATMENT | YIELD-BUSHELS PER ACRE |
| --- | --- |
| 1. Herbicide, then granular fertilizer | 35.25 |
| 2. Herbicide tank-mixed with ACA 15-0-0 Concentrate, then granular 18-46-0 fertilizer | 35.85 |
| 3. Herbicide tank-mixed with Example XIII solution, then granular 18-46-0 fertilizer | 37.65 |
| 4. Herbicide, then granular 18-46-0 fertilizer impregnated w/ACA 15-0-0 Concentrate | 36.83 |

It is clear that the micronutrient composition of the present invention applied as described above, is effective in increasing soybean yield when used in conjunction with application of a herbicide and a granular fertilizer. Moreover, the tests results appear to show a statistically significant yield improvement over the ACA Concentrate 15-0-0 solution when applied in the same manner.

Many different agricultural crops and horticultural plants, for example turf grasses, corn, wheat, soybeans, sugar beets, sunflowers, tomatoes, potatoes, beans, alfalfa, cabbage, carrot and celery can be treated with the micronutrient compositions of the present invention. Application techniques can be significantly varied, however, because of the increased solubility of the new micronutrient compositions of the present invention. More particularly, because the metal alkanoate solutions of the present invention can be readily diluted with water, they can be applied using drip irrigation and overhead spray techniques. This allows the application of the micronutrient compositions of the present invention to be optimally scheduled, and not tied to application of another fertilizer, herbicide, or other maters. In addition, however, because of the capability of the preferred micronutrient compositions of the present invention to dilute in water, and because of the miscibility of such compositions in a wide range of fertilizer solutions, groups can maximize the number of different materials which can be mixed with the micronutrient compositions of the present inventions in a single application across the field. So, for example, this means that the micronutrient compositions of the present invention might be mixed with a herbicide and a high phosphate fertilizer and applied to acreage in a single pass. This saves the grower substantial time, labor and expense—a clear benefit to the grower.

Presently preferred embodiments of the present invention and many of its improvements have been described with a degree of particularity. It should be understood that this description has been made by way of preferred examples, and that the invention is defined by the scope of the following claims.

What is claimed is:

1. A micronutrient solution comprising (a) the reaction product of an ammonium ionic metal alkanoate solution and a carboxylic acid and (b) an aqueous chelated metal solution having a chelated metal selected from the group consisting of iron, copper, manganese, molybdenum and zinc, wherein the pH of the, micronutrient solution is from approximately 6 to approximately 8.

2. The micronutrient solution of claim 1 wherein the metal of the metal alkanoate solution is selected from the group consisting of zinc, magnesium, manganese, calcium, iron, molybdenum, copper, cobalt and boron.

3. The micronutrient solution of claim 2 wherein the carboxylic acid contains from 2–6 carbon atoms.

4. The micronutrient solution of claim 3 wherein the pH of the solution is from approximately 6.5 to approximately 7.0.

5. The micronutrient solution of claim 1 wherein the metal of the metal alkanoate solution is selected from the group consisting of zinc, magnesium, manganese, copper, boron and molybdenum, the carboxylic acid is selected from the group consisting of acetic acid, propionic acid, citric acid and formic acid, and the pH of the solution is from approximately 6.5 to approximately 7.0.

6. A micronutrient solution having the formula $$(RCOO)_2M \cdot 4RCOONH_4$$

wherein M is a metal selected from the group consisting of zinc, magnesium, manganese, calcium, iron, molybdenum, copper, cobalt and boron, R is an alkyl radical having from 2–6 carbon atoms, the micronutrient solution further includes an aqueous chelated metal solution having a chelated metal selected from the group consisting of iron, copper, manganese, molybdenum and zinc, and the pH of the micronutrient solution is from approximately 6.0 to approximately 8.0.

7. The micronutrient solution of claim 6 wherein the pH of the solution is from approximately 6.5 to approximately 7.0.

8. A method of fertilizing plants comprising the step of applying to plants an effective amount of a micronutrient solution comprising (a) the reaction product of an ammonium ionic metal alkanoate solution and a carboxylic acid, and (b) an aqueous chelated metal solution having a chelated metal selected from the group consisting of iron, copper, manganese, molybdenum and zinc, wherein the pH of the micronutrient solution is from approximately 6 to approximately 8.

9. The method of fertilizing plants according to claim 8, wherein the metal of the metal alkanoate solution is selected from the group consisting of zinc, magnesium, manganese, calcium, iron, molybdenum, copper, cobalt and boron and wherein the carboxylic acid contains from 2–6 carbon atoms.

10. The method of fertilizing plants according to claim 9 wherein the pH of the micronutrient solution is from approximately 6.5 to approximately 7.0.

11. The method of fertilizing plants according to claim 9 wherein the carboxylic acid is selected from the group consisting of acetic acid, propionic acid, citric acid and formic acid, and the pH of the solution is from approximately 6.5 to approximately 7.0.

12. The method of fertilizing plants according to claim 9 further comprising the step of mixing the micronutrient solution with a herbicide prior to the micronutrient solution application step.

13. The method of fertilizing plants according to claim 9 wherein the metal of the metal alkanoate is selected from the group consisting of zinc and manganese, the carboxylic acid is acetic acid, and the chelated metal is selected from the group consisting of iron and copper.

14. A method of manufacturing a micronutrient solution comprising the steps of:
mixing a metal salt with water to form a metal salt dispersion;
mixing an ammonia composition with the metal salt dispersion to form an ammoniated metal salt dispersion;
adding a carboxylic acid to the ammoniated metal salt dispersion to solubilize the dispersion; and
adding to the solubilized dispersion an aqueous chelated metal solution having a chelated metal is selected from the group consisting of iron, copper, manganese, molybdenum and zinc, to produce a micronutrient solution.

15. The method of claim 14 wherein the metal of the metal salt is selected from the group consisting of zinc, magnesium, manganese, calcium, iron, molybdenum, copper, cobalt and boron.

16. The method of claim 15 wherein the carboxylic acid contains from 2–6 carbon atoms.

17. The method of claim 14 wherein the metal of the metal salt is selected from the group consisting of zinc, magnesium, manganese, calcium, iron, molybdenum, copper, cobalt and boron, the carboxylic acid contains from 2–6 carbon atoms, and the pH of the micronutrient solution is from approximately 6.0 to approximately 8.0.

18. The method of claim 17 wherein the pH of the micronutrient solution is from approximately 6.5 to approximately 7.0.

19. The method of claim 14 wherein the metal of the metal salt is selected from the group consisting of zinc, magnesium, manganese and boron, the carboxylic acid is selected from the group consisting of acetic acid, propionic acid, formic acid and citric acid, and the pH of the micronutrient solution is from approximately 6.0 to approximately 7.0.

20. The method of claim 14 wherein the metal salt is selected from the group consisting of zinc oxide and manganese oxide, the carboxylic acid is selected from the group consisting of acetic acid, propionic acid, formic acid and citric acid, and the pH of the micronutrient solution is from approximately 6.0 to approximately 7.0.

* * * * *